May 22, 1957

2,810,729

United States Patent Office 2,810,729
Patented Oct. 22, 1957

2,810,729

DERIVATIVES OF 2,4B-DIMETHYL-1,2,3,4,4A,4B,5,6,-
7,9,10,10A - DODECAHYDROPHENANTHRENE-4-
ONE, AND PROCESS OF PREPARING THE SAME

Lewis H. Sarett, Princeton, N. J., assignor to Merck &
Co., Inc., Rahway, N. J., a corporation of New Jersey No Drawing. Application July 26, 1954,
Serial No. 445,921

12 Claims. (Cl. 260—340.9)

This invention relates to novel polyhydrophenanthrene compounds and processes of obtaining the same. More particularly, it is concerned with new 2,4b-dimethyl-1,2,-3,4,4a,4b,5,6,7,9,10,10a - dodecahydrophenanthrene compounds having functional substituents in positions 1, 4 and 7 and an unsaturated aliphatic substituent in position 2, and methods of preparing these compounds.

This application is a continuation-in-part of my co-pending application Serial No. 306,509, filed August 26, 1952, and the co-pending application Serial No. 310,133, filed September 17, 1952, now abandoned.

The novel 2,4b - dimethyl - 1,2,3,4,4a,4b,5,6,7,9,10,10a-dodecahydrophenanthrene compounds of my invention which may be represented as follows:

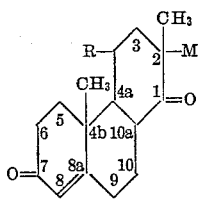

wherein R is a radical from the group consisting of keto and hydroxyl, and M is an unsaturated aliphatic hydrocarbon radical, and derivatives thereof having in place of the 7-keto group a substituent convertible to keto by hydrolysis, are useful in the preparation of other polyhydrophenanthrene compounds, and in the preparation of valuable steroid compounds.

It is an object of my present invention to provide novel 2,4b - dimethyl - 1,2,3,4,4a,4b,5,6,7,9,10,10a-dodecahydrophenanthrene compounds having functional substituents in positions 1, 4 and 7 and an unsaturated aliphatic hydrocarbon substituent at C-2. It is a further object to provide processes for the preparation of said 2,4b-dimethyl-1,2,3,4,4a,4b,5,6,7,9,10,10a - dodecahydrophenanthrene compounds by the addition of an unsaturated aliphatic hydrocarbon substituent to 2,4b-dimethyl-1,2,3,4,4a,4b,-5,6,7,9,10,10a - dodecahydrophenanthrene compounds. Other objects will be apparent from the detailed description of my invention hereinafter provided.

In accordance with my invention, I have now found that the novel 2,4b-dimethyl-1,2,3,4,4a,4b,5,6,7,9,10,10a-dodecahydrophenanthrene compounds having an unsaturated aliphatic hydrocarbon substituent can be prepared by reactions which may be shown as follows:

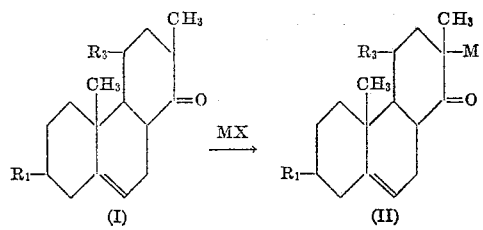

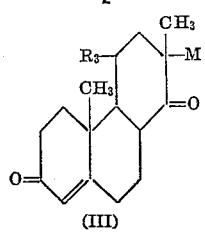

wherein $R_3$ is a radical from the group consisting of keto and hydroxyl, $R_1$ is a substituent convertible to keto by hydrolysis, M is an unsaturated aliphatic hydrocarbon radical, and X is a halogen.

In accordance with the foregoing reaction scheme, the starting dodecahydrophenanthrene compound (I) wherein the 7-keto substituent is blocked by a group convertible to keto by hydrolysis, is reacted with a monohalide derivative of an unsaturated aliphatic hydrocarbon in the presence of an alkali metal or a metal alkoxide to form the corresponding compound (II) having an unsaturated aliphatic hydrocarbon radical in the 2-position. This product on hydrolysis with acid forms the corresponding compound having a free keto group in position 7 (III).

The process of introducing an unsaturated aliphatic hydrocarbon substituent in the 2 position is most conveniently effected by reacting the starting material with an unsaturated aliphatic hydrocarbon halide in the presence of an alkali metal or a metal alkoxide in a suitable inert organic solvent. Alkali metals, such as potassium or a potassium-sodium alloy, and metal alkoxides, such as potassium tertiary butoxide, sodium tertiary butoxide, sodiummethylate, potassium methylate, sodium ethylate, aluminum tertiary butoxide, aluminum isopropoxide, and the like can be used in this reaction. Inert organic solvents such as benzene, toluene, xylene, dioxan, and the like are suitable reaction mediums for carrying out this condensation.

In carrying out this reaction, I find that it is generally desirable to use an iodide derivative of the unsaturated aliphatic hydrocarbon since the use of the iodide compounds usually results in the obtainment of maximum yields of the desired products under optimum conditions, although other haldies such as the bromide and chloride can also be used. Uusally, I find it desirable to employ an amount of the halide in excess of that theoretically required to obtain maximum yields of the desired condensation products.

Thus, in accordance with my present invention the dodecahydrophenanthrene compounds can be reacted with an unsaturated aliphatic hydrocarbon halide to form the corresponding dodecahydrophenanthrene having the unsaturated aliphatic hydrocarbon radical in the 2 position. For example, the dodecahydrophenanthrenes can be reacted with a methallyl halide, an allyl halide or a propargyl halide to form the corresponding 2-methallyl, 2-allyl and 2-propargyl derivatives, respectively.

The processes of my invention, and, in particular, certain preferred embodiments thereof can be further illustrated by the application of these processes to the preparation of specific products. Thus, the 2-methallyl derivatives of 2,4b-dimethyl-7-ethylenedioxy-1,2,3,4,4a,4b,5,6,7,-8,10,10a-dodecahydrophenanthrene-1,4-dione and 2,4b-dimethyl-7-ethylene-dioxy - 1,2,3,4,4a,4b,5,6,7,8,10,10a - dodecahydrophenanthrene-4-ol-1-one are conveniently prepared by reacting the 2,4b-dimethyl-7-ethylenedioxy-1,2,3-4,4a,4b,5,6,7,8,10,10a-dodecahydrophenanthrene dione or olone with an excess of methallyl iodide in the presence of potassium tertiary butoxide at room temperature. After allowing the resulting reaction mixture to stand at room temperature for about 1 hour, the product is recovered by pouring the reaction mixture into water, extracting it with ether and evaporating the ethereal extracts to dryness. If desired, the product can be further purified by chromatography or by recrystallization from a suitable solvent such as alcohol or ether. The 2-allyl and 2-propargyl derivatives can be prepared and isolated in the same manner using allyl iodide and propargyl iodide in place of methallyl iodide.

The derivatives of 2,4b-dimethyl-7-ethylenedioxy-1,2,3,-4,4a,4b,5,6,7,8,10,10a - dodecahydrophenanthrene - 1,4 - dione or the corresponding 4-ol-1-one compound having an unsaturated aliphatic hydrocarbon radical substituent in the 2 position can be cleaved by hydrolysis with acids, or substances giving rise to acids, to convert the ethylenedioxy substituent to a keto substituent, and cause a shifting of the double bond to the 8, 8a position. For example, upon hydrolyzing 2,4b-dimethyl-2-methallyl-7-ethylenedioxy - 1,2,3,4,4a,4b,5,6,7,8,10,10a-dodecahydrophenanthrene-1,4-dione with acid the ethylenedioxy substituent is cleaved and the double bond in position 8a, 9 is shifted to the 8, 8a position forming 2,4b-dimethyl-2-methallyl - 1,2,3,4,4a,4b,5,6,7,9,10,10a - dodecahydrophenanthrene-1,4,7-trione.

The processes of the present invention have been specifically described and illustrated above by the application to dodecahydrophenanthrene compounds wherein the 7-keto substituent is blocked or protected by the ethylenedioxy substituent. In place of using such 7-ethylenedioxy dodecahydrophenanthrene compounds, the methods of my invention can be used employing as starting materials dodecahydrophenanthrene compounds having other protecting groups which can be cleaved by hydrolysis to form the 7-keto compound. Thus, derivatives of the dodecahydrophenanthrene compounds wherein the 7-keto group is blocked or protected by the formation of an enol ether, a cyclic ether, or another ketal substituent, and the like can be used in place of the 7-ethylenedioxy compounds. For example, enol ether derivatives of the formula

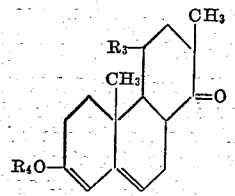

wherein $R_3$ is the same as defined above and $R_4$ is a hydrocarbon radical, are suitable starting materials in our process. The methyl and ethyl enol ethers which are readily prepared are particularly suitable as starting materials. Cyclic ketal derivatives, such as the 7-ethylenedioxy derivative of the formula

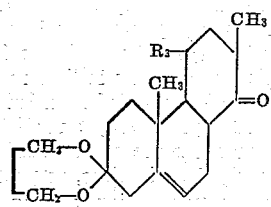

the corresponding monothio ketal derivative of the formula

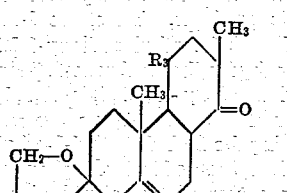

and the corresponding dithioketal derivatives of the formula

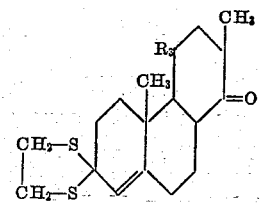

wherein $R_3$ is the same as defined above, are also useful in our process of introducing the 4b-methyl substituent. Similarly, other cyclic ketal derivatives such as the trimethylene, propylene, and butylene ketals, can be used to protect the 7-keto substituent. Upon hydrolyzing these enol ether and ketal derivatives with acid, the protecting substituent is cleaved and the 7-keto compound having a double bond in position 8, 8a is obtained.

The novel dodecahydrophenanthrene compounds having a lower alkylene or lower alkine substituent in the 2 position prepared in accordance with this invention are useful in the field of pharmaceuticals. These unsaturated aliphatic hydrocarbon substituents after suitable modification provide a side chain which can be treated to effect ring closure and the formation of ring D of steroid compounds. Thus, they are important intermediates for the conversion of dodecahydrophenanthrene compounds to valuable steroid compounds such as cortisone, 11-ketoprogesterone and the like by total synthesis. For example, 2-methallyl-2,4b-dimethyl-7-ethylenedioxy-1,2,3,4,-4a,4b,5,6,7,8,10,10a-dodecahydrophenanthrene-1,4 - dione can be converted to the valuable adrenal hormones, 11-dehydrocorticosterone and cortisone in accordance with the following procedures:

Condensation of 2-methallyl-2,4b-dimethyl-7-ethylenedioxy 1,2,3,4,4a,4b,5,6,7,8,10,10a - dodecahydrophenanthrene-1,4-dione with ethoxyacetylene magnesium bromide yields 2,4b - dimethyl - 2 - methallyl - 1 - ethoxyethinyl - 7 ethylenedioxy - 1,2,3,4,4a,4b,5,6,7,8,10,10a-dodecahydrophenanthrene - 1 ol - 4 - one, M. P. 131–132° C. When this ethoxyethinyl compound is treated with dilute sulfuric acid, 2,4b - dimethyl - 2 - methallyl-1 - carboethoxy methylene - 7 - ethylene - dioxy - 1,2,3, 4,4a,4b,5,6,7,8,10,10a - dodecahydrophenanthrene - 4-one, M. P. 94–96° C. is obtained. Upon hydrolyzing this compound with alkali the corresponding free acid, M. P. 203–205° C. is produced. Reduction of this keto acid with sodium borohydride to the 4-hydroxy acid, followed by reduction of the conjugated double bond with potassium - ammonia - isopropyl alcohol affords 2,4b - dimethyl - 1 - carboxymethyl - 2 - methallyl - 7 - ethylenedioxy - 1,2,3,4,4a,4b,5,6,7,8,10,10a - dodecahydrophenanthrene - 4 - ol, M. P. 255–257° C. Reduction of this carboxymethyl compound with lithium aluminum hydride yields the corresponding 1 - (β - hydroxyethyl) derivative M. P. 199–201° C. and 210–211° C., which on reaction with p-toluene sulfonyl chloride in the presence of pyridine gives the 1 - (β - toluene sulfonate), M. P. 157–158° C. Successive oxidations of this monotosylate derivative with the chromium trioxide-pyridine complex, with osmium tetroxide and with periodic acid yields 2,4b-dimethyl - 1β - (β - p - toluenesulfonyloxyethyl) - 2 - acetonyl - 7 - ethylenedioxy - 1,2,3,4,4a,4b,5,6,7,8,10,10a-dodecahydrophenanthrene - 4 - one, M. P. 105–108° C. Upon reacting this product with sodium methoxide dl-3 - ethylenedixy - Δ⁵ - 17α - pregnene - 11, 20 - dione, M. P. 212–214° C. is obtained which on equilibration with alkali gives the 3 - ethylene - dioxy derivative of dl - 11-keto progesterone, M. P. 181–182.5° C. Acid hydrolysis of this product affords dl - 11 - ketoprogesterone. Reaction of the 3 - ethylenedioxy derivative of dl - 11 - ketoprogesterone with an oxalyl ester yields the corresponding 21 - oxalyl ester compound which on hydrolysis is converted to the free acid. Resolution of the dl - 21 - oxalyl acid by means of the strychnine salt followed by hydrolysis of the oxalyl acid group gives 3 - ethylenedioxy - Δ⁵-pregnene - 11,20 - dione, M. P. 175–176.5° C. which on hydrolysis with acid affords 11 - ketoprogesterone, identical with material prepared from natural sources. Iodination and acetoxylation of the 21 - oxalyl acid of 3 - ethylenedioxy - Δ⁵ - pregnene - 11,20 - dione obtained as described above yields successively crystalline 3 - ethylenedioxy - 21 - iodo - Δ⁵ - pregnene - 11,20 - dione and 3 - ethylenedioxy - Δ⁵ - pregnene - 2- ol - 11,20 - dione acetate, M. P. 193.5–194° C. Acid hydrolysis of this latter compound yields 11 - dehydrocorticosterone identical with the product obtained from natural sources. Conversion of the 3 - ethylenedioxy - Δ⁵ - pregnene - 21-ol - 11,20 - dione acetate to the 20 cyanhydrin, M. P. dec. 220–224° C., and dehydration of this product gives the Δ⁵,¹⁷ - 20 - cyanopregnadiene, M. P. 203° C. which on oxidation with potassium permanganate yields 2-ethylenedioxy - Δ⁵ - pregnene - 17,21 - diol - 11,20 - dione acetate, dec. 262–267° C. Acid hydrolysis of the latter compound yielded cortisone acetate. These reactions are described in the publication entitled "Stereospecific Total Synthesis of Cortisone" which appeared in the Journal of the American Chemical Society, volume 74, pages 4974–4975.

Alternatively, following procedures described in detail in co-pending application Serial No. 310,133, 2,4b - dimethyl - 1 - carboxymethyl - 2 - methallyl - 7 - ethylenedioxy - 1,2,3,4,4a,4b,5,6,7,8,10,10a - dodecahydrophenanthrene - 4 - ol, which can be prepared as described above, can be converted to dl - 11 - ketoprogesterone as follows: 2,4b - dimethyl - 1 - carboxymethyl - 2 - methallyl - 7 - ethylene - dioxy - 1,2,3,4,4a,4b,5,6,7,8,10,10a- dodecahydrophenanthrene - 4 -ol is reacted with an oxidizing agent to produce the corresponding 4-keto compound which is then reacted with an esterifying agent to form the corresponding 2,4b - dimethyl - 1 - carboalkoxymethyl - 2 - methallyl - 7 - ethylenedioxy - 1,2,3,4,4a,4b, 5,6,7,8,10,10a - dodecahydrophenanthrene - 4 - one. Reaction of this compound with ozone followed by hydrolysis of the ozonide results in the obtainment of 2,4b-dimethyl 1 - carboalkoxymethyl - 2 - acetonyl - 7 - ethylenedioxy - 1,2,3,4,4a,4b,5,6,7,8,10,10a - dodecahydrophenanthrene - 4 - one. The latter compound is reacted, under substantially anhydrous conditions, with a strong alkali thereby forming Δ⁵ - 3 - ethylenedioxy - 11,16,20-triketo - pregnene. The Δ⁵ - 3 - ethylenedioxy - 11,16,20-triketo-pregnene is reacted with an organic sulfonyl halide thereby forming the corresponding sulfonate ester of Δ⁵,¹⁶ - 3 - ethylenedioxy - 11,20 - diketo - 16 - hydroxy-pregnadiene, which is reacted with hydrogen in the presence of a hydrogenation catalyst to produce Δ⁵ - 3 - ethylenedioxy - 11,20 - diketo - pregnene. The Δ⁵ - 3 - ethylenedioxy - 11,20 - diketo - pregnene is then reacted with an aqueous mineral acid solution whereupon the ethylenedioxy substituent attached to the 3-carbon atom is hydrolyzed and, at the same time, the double bond shifts from ring B to ring A to form Δ⁴ - 3,11,20 - triketo - pregnene.

The compounds of our invention having a 4-hydroxy substituent can be readily oxidized by treatment with an oxidizing agent such as pyridine-chromium trioxide complex to convert this substituent to a keto group.

In somewhat similar manner, the corresponding 2-allyl and 2-propargyl compounds obtained in accordance with the present invention can be converted to valuable steroids. For example, following the procedures described above, 2,4b-dimethyl-2-allyl-7-ethylenedioxy-1,2,3,4,4a,4b 5,6,7,8,10,10a-dodecahydrophenanthrene - 4 - ol-1-one can be converted to the tosylate derivative of 1-(β-hydroxyethyl) - 2,4b-dimethyl-2-allyl-7-ethylenedioxy - 1,2,3,4,4a, 4b,5,6,7,8,10,10a - dodecahydrophenanthrene - 1,4-dione. The 2-allyl substituent of this product can then be converted to obtain the corresponding 2-(β,γ-dihydroxypropyl) compound which can be selectively esterified to form γ-monoester. Oxidation of this monoester affords the corresponding substituted acetonyl compound which can be converted to the cyclized product, the ester of the 20-keto-21-hydroxy pregnene. The pregnene compound so obtained can then be converted to other valuable steroid compounds following the methods described above.

Similarly, the 2-propargyl compound of the present invention can be selectively hydrogenated to obtain the 2-allyl compound which can then be converted to valuable steroids by the above described procedures.

The following examples illustrate methods of carrying out my invention.

EXAMPLE 1

*Preparation of 2,4b-dimethyl-2-methallyl-7-ethylenedioxy-1,2,3,4,4a,4b,5,6,7,8,10,10a-dodecahydrophenanthrene-1,4-dione*

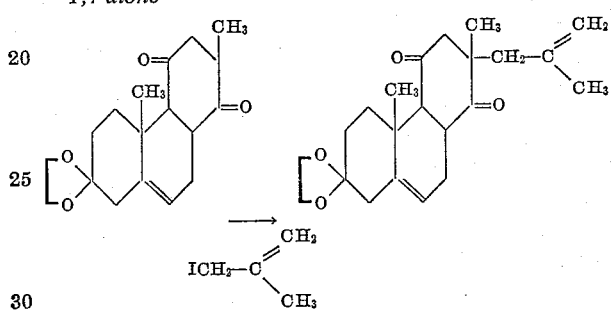

A solution of 304 mg. of 2,4b-dimethyl-7-ethylenedioxy - 1,2,3,4,4a,4b,5,6,7,8,10,10a - dodecahydrophenanthrene-1,4-dione (M. P. 149–150.5° C.) which may be prepared as described in copending application Serial No. 401,705, filed December 31, 1953, in 3.0 cc. of dry benzene was treated with 0.3 cc. of methallyl iodide and then with 1.2 cc. of tertiary butyl alcohol containing 40 mg. of dissolved potassium. After standing in a stoppered flask at room temperature for one hour, the mixture was poured into water and extracted with ether. Evaporation of the ethereal layer gave a residue of crude 2,4b - dimethyl-2-methallyl-7-ethylenedioxy-1,2,3,4,4a,4b, 5,6,7,8,10,10a-dodecahydrophenanthrene-1,4-dione which could be purified by adsorption on acid-washed alumina followed by elution with a petroleum ether-ether mixture. It was a colorless oil, soluble in warm petroleum ether.

EXAMPLE 2

*Preparation of 2,4b-dimethyl-2-methallyl-7-ethylenedioxy-1,2,3,4,4a,4b,5,6,7,8,10,10a-dodecahydrophenanthrene-1,4-dione*

A solution of 16.0 g. of 2,4b-dimethyl-7-ethylenedioxy-1,2,3,4,4a,4b,5,6,7,8,10,10a-dodecahydrophenanthrene1,4-dione (M. P. 149–150.5° C.) in 190 cc. of benzene was concentrated to 160 cc. to insure dryness. The solution was then placed under nitrogen and treated successively with 16.0 cc. of methallyl iodide and 70 cc. of tertiary butyl alcohol containing 2.31 g. of dissolved potassium. After standing at room temperature for three hours, the mixture was poured into ether, washed with water, concentrated to dryness and purified by chromatography over activated alumina. Elution of the alumina with an ether-petroleum ether mixture yielded 2,4b-dimethyl-2-methallyl-7-ethylenedioxy-1,2,3,4,4a,4b,5,6,7,8,10,10a-dodecahydrophenanthrene-1,4-dione (M. P. 107° C.).

Another isomeric form of this compound having a melting point of 139° C. was also recovered from the chromatographic column.

Upon treatment with acid, these products are hydrolyzed to the 2,4b-dimethyl-2-methallyl-1,2,3,4,4a,4b,5,6,7, 9,10,10a - dodecahydrophenanthrene - 1,4,7-trione compounds.

The same methallyl substituted products are obtained when any of the three isomeric forms of 2,4b-dimethyl-7-ethylenedioxy - 1,2,3,4,4a,4b,5,6,7,8,10,10a - dodecahydrophenanthrene-1,4-dione described in copending application Serial No. 401,705, or mixtures of these isomeric forms, are employed as starting materials in the foregoing example.

EXAMPLE 3

*Preparation of 2,4b-dimethyl-2-methallyl-7-ethylenedioxy-1,2,3,4,4a,4b,5,6,7,8,10,10a - dodecahydrophenanthrene-4-ol-1-one*

A solution of 2.15 g. of 2,4b-dimethyl-7-ethylene-dioxy-1,2,3,4,4a,4b,5,6,7,8,10,10a - dodecahydrophenanthrene - 4-ol-1-one (M. P. 186–189° C.), which can be prepared as described in copending application Serial No. 401,705, filed December 31, 1953, in 25 cc. of benzene was concentrated to 21 cc. A mixture of 2.0 cc. of benzene and 14.0 cc. of tertiary butyl alcohol containing 466 mg. of dissolved potassium was then added, followed by 2.0 cc. of methallyl iodide. The stoppered flask was held at 35° C. for twenty minutes. The mixture was then poured into ether, washed with water and concentrated to dryness. Crystallization of the residue from ether or alcohol gave 2,4b - dimethyl - 2 - methallyl - 7 - ethylenedioxy - 1,2,3,-4, 4a,4b,5, 6, 7, 8, 10, 10a-dodecahydrophenanthrene - 4 - ol-1-one, M. P. 166–168° C.

Upon hydrolyzing this product with acid 2,4b-dimethyl-2 - methallyl - 1,2,3,4,4a,4b,5,6,7,9,10,10a - dodecahydrophenanthrene-4-ol-1,7-dione is obtained.

EXAMPLE 4

*2,4b - dimethyl - 2 - allyl - 7 - ethylenedioxy - 1,2,3,4,4a,- 4b,5,6,7,8,10,10a - dodecahydrophenanthrene - 4 - ol - 1-one*

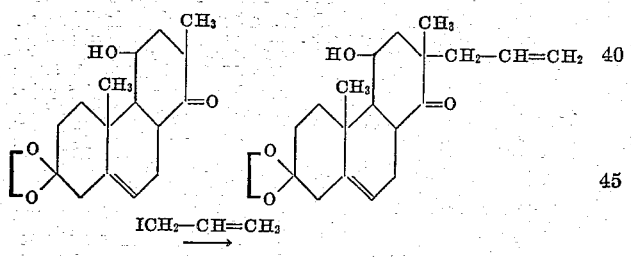

To 4.0 g. of 2,4b-dimethyl-7-ethylenedioxy-1,2,3,4,4a,-4b,5,6,7,8,10,10a - dodecahydrophenanthrene - 4 - ol - 1 - one, dissolved in 50 ml. anhydrous benzene, was added 20 ml. of a 1 M solution of potassium t-butoxide in t-butyl alcohol and 3 ml. of allyl iodide. The solution was allowed to stand at room temperature for one hour, after which time ice water was added. The mixture was then extracted with ether, and the extract concentrated to dryness. Chromatography of a benzene-petroleum ether solution of the crystalline residue on acid-washed alumina and elution with ether-petroleum ether yielded the desired product, 2,4b-dimethyl-2-allyl-7-ethylenedioxy 1,2,3,-4,4a,4b5,6,7,8,10,10a-dodecahydrophenanthrene - 4 -ol - 1-one, melting point 148–150° C.

On hydrolysis with acid this product yields 2,4b-dimethyl - 2 - allyl - 1,2,3,4,4a,4b,5,6,7,9,10,10a - dodecahydrophenanthrene-4-ol-1,7-dione.

In a similar manner, 2,4b-dimethyl-2-allyl-7-ethylenedioxy - 1,2,3,4,4a,4b,5,6,7,8,10,10a - dodecahydrophenanthrene-1,4-dione is obtained by reacting 2,4b-dimethyl-7-ethylenedioxy 1,2,3,4,4a,4b,5,6,7,8,10,10a - dodecahydrophenanthrene-1,4-dione with allyl iodide in the presence of potassium t-butoxide. Hydrolysis of this product with acid yields 2,4b-dimethyl-2-allyl-1,2,3,4,4a,4b,5,6,7,9,10,-10a-dodecahydrophenanthrene-,1,4,7-trione.

EXAMPLE 5

*Preparation of 2,4b-dimethyl-2-propargyl-7-ethylenedioxy-1,2,3,4,4a,4b,5,6,7,8,10,10a - dodecahydrophenanthrene-4-ol-1-one*

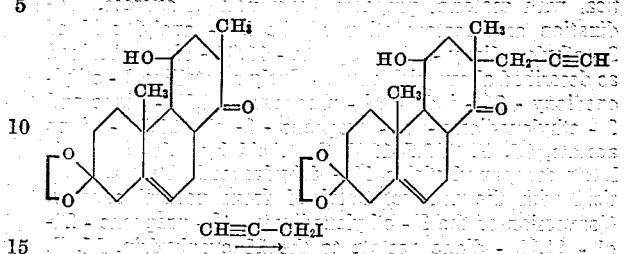

A solution of 2 g. of 2,4b-dimethyl-7-ethylenedioxy-1,2-3,4,4a,4b,5,6,7,8,10,10a - dodecahydrophenanthrene - 4 - ol-1-one in 25 ml. of benzene and 8 ml. of 1 M potassium tertiary butoxide was treated with 1.7 ml. of propargyl iodide. After standing a few minutes at room temperature, a finely divided precipitate of potassium iodide separated from the reaction mixture. After 24 hours at room temperature, water was added and the organic material extracted with ether. The ethereal solution was evaporated to dryness and the residue chromatographed on alumina.

Consecutive fractions of the eluate (petroleum ether-ether) yield two isomeric forms of 2,4b-dimethyl-2-propargyl - 7 - ethylenedioxy-1,2,3,4,4a,4b,5,6,7,8,10,10a-dodecahydrophenanthrene-4-ol-1-one melting at 180° C. and 126–128° C. respectively. Hydrolysis of these compounds with acid yields the two isomeric 2,4b-dimethyl-2-propargyl - 1,2,3,4,4a,4b,5,6,7,9,10,10a - dodecahydrophenanthrene-4-ol-1,7-diones.

In similar manner, 2,4b-dimethyl-2-propargyl-7-ethylenedioxy - 1,2,3,4,4a,4b,5,6,7,8,10,10a - dodecahydrophenanthrene-1,4-dione is obtained by reacting 2,4b-dimethyl-7 - ethylenedioxy - 1,2,3,4,4a,4b,5,6,7,8,10,10a - dodecahydrophenanthrene-1,4-dione with propargyl iodide in the presence of potassium t-butoxide. Hydrolysis of this product with acid yields 2,4b-dimethyl-2-propargyl-1,2,3,-4,4a,4b,5,6,7,9,10,10a - dodecahydrophenanthrene - 1,4,7-trione.

The 2,4b - dimethyl-1,2,3,4,4a,4b,5,6,7,9,10,10a-dodecahydrophenanthrene - 1,4,7 - trione and the 2,4b - dimethyl-1,2,3,4,4a,4b,5,6,7,9,10,10a - dodecahydrophenanthrene-4-ol-1,7-dione and the 7-ethylenedioxy derivatives thereof utilized as starting materials in this invention can be prepared as described in the copending application Seriol No. 401,705, filed December 31, 1953. Thus, the 7-ethylenedioxy derivatives of 2,4b - dimethyl - 1,2,3,4,4a,4b,5,6,7,9,10,10a-dodecahydrophenanthrene-1,4,7-trione and the corresponding 4-ol-1,7-dione compound can be prepared as follows:

β-Ethoxy-propionaldehyde is reacted with ethyl magnesium bromide to produce 1-ethoxy-3-hydroxy-pentane which is oxidized with chromic acid to form 1-ethoxy-3-keto-pentane. Upon reacting this compound with ethyl orthoformate in alcohol solution containing a trace of hydrogen chloride, 1,3,3-triethoxy-pentane is obtained. Reaction of the latter compound with hot potassium acid sulfate produces 3-ethoxy - 1,3 - pentadiene. When the 3-ethoxy-1,3-pentadiene is condensed with benzoquinone in accordance with the Diels-Alder procedure, 5-methyl-6 - ethoxy - 1,4,4a,5,8,8a - hexahydronaphthalene - 1,4-dione is obtained. Hydrogenation of this compound in the presence of Raney nickel produced 5-methyl-6-ethoxy-1,2,3,4,4a,5,8,8a - octahydronaphthalene-1,4-dione. Further reduction of this compound by reaction with lithium aluminum hydride affords the corresponding diol, 5 - methyl - 6 - ethoxy - 1,2,3,4,4a,5,8,8a - octahydronaphthalene-1,4-diol. Upon reacting this compound with dilute acetic acid, 5-methyl-6-ketoperhydronaphthalene-1,4-diol is obtained. When the 5-methyl-6-keto-perhydronaphthalene is condensed with methyl vinyl ketone in an alkaline reaction medium 7-keto-4b-methyl-1,2,3,4,4a,4b, 5,6,7,9,10,10a - dodecahydrophenanthrene-1,4-diol is obtained. Upon reacting the latter product with ethylene glycol in the presence of p-toluene sulfuric acid the corresponding 3 - ethylenedioxy derivative, 4b - methyl - 7 - ethylenedioxy - 1,2,3,4,4a,4b,5,6,7,8,10,10a, - dodecahydrophenanthrene - 1,4 - diol is obtained. Oxidizing this compound by reaction with aluminum isopropoxide in the presence of cyclohexanone forms a mixture containing 4b - methyl - 7 - ethylenedioxy - 1,2,3,4,4a,4b,5,6,7,8,10,10a-dodecahydrophenanthrene - 14 - dione and the corresponding 4-ol-1-one compound which can be separated and recovered by fractional crystallization and/or chromatography. The products so obtained can be converted to the corresponding 2,4b-dimethyl compounds by first reacting the compounds with methyl formate in the presence of sodium hydride to obtain the 2-formyl derivatives, then reacting the formyl derivatives with methyl iodide in the presence of anhydrous potassium carbonate to produce the 2-formyl-2-methyl derivatives, and finally subjecting these latter derivatives to hydrolysis by chromatography over alkaline alumina to obtain respectively, 2,4b - dimethyl - 7 - ethylenedioxy - 1,2,3,4,4a,4b,5,6,7,8,10,10a - dodecahydrophenanthrene - 1,4 - dione and the corresponding 4-ol-1-one compound.

Similarly, upon reacting 7-keto-4b-methyl-1,2,3,4,4a,4b,5,6,7,9,10,10a - dodecahydrophenanthrene - 1,4 - diol with an ortho ester of an alcohol, such as methanol or ethanol, in the presence of an acidic catalyst, the corresponding enol ethers are obtained which may be oxidized by reaction with aluminum isopropoxide in the presence of cyclohexanone to obtain the enol ethers of 4b - methyl - 7 - ethylenedioxy - 1,2,3,4,4a,4b,5,6,7,9,10,10a-dodecahydrophenanthrene-1,4-dione and the corresponding 4-ol-1-one compound which can be separated and recovered by fractional crystallization and/or chromatography. The latter compounds can then be converted to the corresponding 2,4b-dimethyl compounds by the methods described above.

Various changes and modifications may be made in my invention, certain preferred embodiments of which are herein described, without departing from the scope thereof. It is my intention that such changes and modifications, to the extent that they are within the scope of the appended claims, will be construed as part of my invention.

What I claim is:

1. A dodecahydrophenanthrene compound from the group consisting of compounds of the formula:

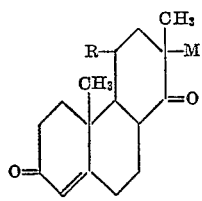

wherein R is a member from the group consisting of keto and hydroxyl, and M is an unsaturated lower aliphatic hydrocarbon radical having an unsaturated bond between carbon atoms 2 and 3, and 7-lower alkyl-enol ether and 7-lower alkylene ketal derivatives thereof.

2. 2,4b-dimethyl - 2 - methallyl - 7 - ethylenedioxy-1,2,3,4,4a,4b,5,6,7,8,10,10a - dodecahydrophenanthrene - 1,4-dione.

3. 2,4b - dimethyl - 2 - methallyl - 7 - ethylenedioxy - 1,2,3,4,4a,4b,5,6,7,8,10,10a - dodecahydrophenanthrene - 4-ol-1-one.

4. 2,4b-dimethyl - 2 - allyl - 7 - ethylenedioxy-1,2,3,4,4a,4b,5,6,7,8,10,10a-dodecahydrophenanthrene-1,4-dione.

5. 2,4b -dimethyl - 2 - allyl - 7 - ethylenedioxy - 1,2,3,4,4a,4b,5,6,7,8,10,10a - dodecahydrophenanthrene - 4 - ol-1-one.

6. 2,4b - dimethyl - 2 - propargyl - 7 - ethylenedioxy - 1,2,3,4,4a,4b,5,6,7,8,10,10a - dodecahydrophenanthrene - 4-ol-1-one.

7. The process which comprises reacting a member from the group consisting of 7-lower alkyl-enol ether and 7-lower alkylene ketal derivatives of a compound of the formula:

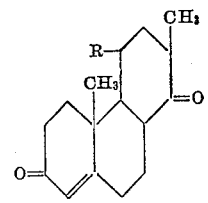

wherein R is a member from the group consisting of keto and hydroxyl, with an unsaturated lower aliphatic hydrocarbon halide having an unsaturated bond between carbon atoms 2 and 3 in the presence of a member of the group consisting of alkali metals and metal alkoxides to form the corresponding 7-derivative of a compound of the formula:

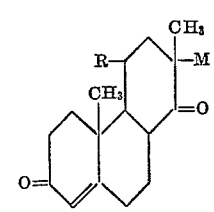

wherein R is the same as defined above and M is an unsaturated aliphatic hydrocarbon radical having an unsaturated bond between carbon atoms 2 and 3.

8. The process which comprsies reacting 2,4b-dimethyl-7 - ethylenedioxy - 1,2,3,4,4a,4b,5,6,7,8,10,10a - dodecahydrophenanthrene-1,4 dione with methallyl iodide in the presence of potassium tertiary butoxide to produce 2,4b-dimethyl - 2 - methallyl - 7 - ethylenedioxy - 1,2,3,4,4a,4b,5,6,7,8,10,10a-dodecahydrophenanthrene-1,4-dione.

9. The process which comprises reacting 2,4b-dimethyl-7 - ethylenedioxy - 1,2,3,4,4a,4b,5,6,7,8,10,10a - dodecahydrophenanthrene-4-ol-1-one with methallyl iodide in the presence of potassium tertiary butoxide to produce 2,4b-dimethyl - 2 - methallyl - 7 - ethylenedioxy - 1,2,3,4,4a,4b,5,6,7,8,10,10a-dodecahydrophenanthrene-4-ol-o1-one.

10. The process which comprises reacting 2,4b-dimethyl-7-ethylenedioxy - 1,2,3,4,4a,4b,5,6,7,8,10,10a-dodecahydrophenanthrene-4-ol-1-one with allyl iodide in the presence of potassium tertiary butoxide to produce 2,4b-dimethyl-2-allyl-7-ethylenedioxy - 1,2,3,4,4a,4b,5,6,7,8,10,10a-dodecahydrophenanthrene-4-ol-1-one.

11. The process which comprises reacting 2,4b-dimethyl - 7 - ethylenedioxy-1,2,3,4,4a,4b,5,6,7,8,10,10a-dodecahydrophenanthrene-1,4 dione with allyl iodide in the presence of potassium tertiary butoxide to produce 2,4b-dimethyl-2-allyl-7-ethylenedioxy - 1,2,3,4,4a,4b,5,6,7,8,10,10a-dodecahydrophenanthrene-1,4-dione.

12. The process which comprises reacting 2,4b-dimethyl - 7 - ethylenedioxy-1,2,3,4,4a,4b,5,6,7,8,10,10a-dodecahydrophenanthrene-4-ol-1-one with propargyl iodide in the presence of potassium tertiary butoxide to produce 2,4b-dimethyl-2-propargyl-7-ethylenedioxy - 1,2,3,4,4a,4b,5,6,7,8,10,10a-dodecahydrophenanthrene-4-ol-1-one.

References Cited in the file of this patent
Sarett et al.: JACS, vol. 74, pp. 4974–76 (Oct. 5, 1952).